(12) United States Patent
Gentilman et al.

(10) Patent No.: US 7,710,347 B2
(45) Date of Patent: May 4, 2010

(54) METHODS AND APPARATUS FOR HIGH PERFORMANCE STRUCTURES

(75) Inventors: Richard Gentilman, Acton, MA (US);
David G. Burks, Tucson, AZ (US);
Derrick J. Rockosi, Lynn, MA (US);
Christopher K. Solecki, Allen, TX (US); Thomas Fetsko, Tucson, AZ (US);
Marlene Platero, Vail, AZ (US)

(73) Assignee: Raytheon Company, Waltham, MA (US)

( * ) Notice: Subject to any disclaimer, the term of this patent is extended or adjusted under 35 U.S.C. 154(b) by 32 days.

(21) Appl. No.: 12/048,075

(22) Filed: Mar. 13, 2008

(65) Prior Publication Data
US 2009/0096687 A1    Apr. 16, 2009

Related U.S. Application Data

(60) Provisional application No. 60/894,629, filed on Mar. 13, 2007.

(51) Int. Cl.
*H01Q 1/42* (2006.01)
(52) U.S. Cl. .................................. 343/872; 343/705

(58) Field of Classification Search ................ 343/705, 343/708, 700 MS, 872; 257/705, 706, 712, 257/713, 717, 720; 264/432, 434, 647
See application file for complete search history.

(56) References Cited

U.S. PATENT DOCUMENTS

| 5,834,840 | A  | * | 11/1998 | Robbins et al. | ............. | 257/705 |
| 6,197,243 | B1 | * | 3/2001  | Tiegs et al.   | ................ | 264/432 |
| 6,670,039 | B1 | * | 12/2003 | Nagle et al.   | ................ | 428/408 |

OTHER PUBLICATIONS

Raytheon Company, Broadband Hypersonic Radomes, Dec. 21, 2006.

* cited by examiner

*Primary Examiner*—Hoang V Nguyen
(74) *Attorney, Agent, or Firm*—The Noblitt Group, PLLC

(57) ABSTRACT

Methods and apparatus for components according to various aspects of the present invention operate in conjunction with reaction bonded silicon nitride (RBSN). In one embodiment, a missile radome comprises a wall defining the radome body, including a base and a tip. The wall may comprise a core and one or more skins adjacent the core, such as in a sandwich configuration. The core and the skins may have different densities. The radome wall may be configured to transmit wideband RF signals. The RBSN may be extruded to form the radome.

21 Claims, 4 Drawing Sheets

NOTIONAL DIMENSION (in)

METHODS AND APPARATUS FOR HIGH PERFORMANCE STRUCTURES

CROSS-REFERENCES TO RELATED APPLICATIONS

This application claims the benefit of U.S. Provisional Patent Application No. 60/894,629, filed Mar. 13, 2007, and incorporates the disclosure of such provisional application by reference.

BACKGROUND

Many systems and structures perform under varying, and often extreme, conditions. For example, systems exposed to high heat conditions must perform their functions at high temperatures. Such extreme temperatures or other conditions are common for certain aircraft, such as high-speed airplanes, missiles, and spacecraft. Hypersonic missiles travel through the atmosphere at speeds in the Mach 5-7 range or higher, which may expose missile elements to stagnation temperatures of approximately 1400° C. or more for several minutes.

Performance of aircraft elements may be limited by such high temperatures. Radomes present exemplary design issues for such high temperature applications. Missile radome performance may be limited by temperature, as well as waveband transmittance, material, process maturity, and affordability. Radomes, thermal protection systems (TPS), and aircraft leading edges require high temperature capability over sustained periods, all-weather durability, and electrical and/or thermal performance characteristics at a reasonable cost.

Further, as missile systems assume multiple roles and become more autonomous, missile seekers need to detect, discriminate, and track a larger variety of targets. Targets may be detected at dissimilar frequencies, employ various forms of jamming and/or countermeasures, and reside in operational environments with differing amounts of clutter. Broadband radomes may allow multiple sensors for broadband detection, as well as more effective narrowband seekers, for example by allowing use of multiple seeker combinations without changing the radome and/or future use of alternative seekers without redesigning and replacing the radome itself.

Numerous and complex design considerations affect radomes, especially high-speed broadband radomes. Electrical properties include transmission loss, sidelobe degradation, boresight error, bandwidth, and polarization. Aerodynamic factors may comprise drag, heating and ablation, while mechanical concerns include weight, shock resistance, vibration, impact resistance, and material static strength. Material selection may affect dielectric loss, operating temperature, strength, impact resistance, and manufacturing tolerances. Also, RF signature, IR signature, and optical observance factors play a role in design. From an environmental standpoint, rain erosion, hail/bird impacts, static discharge, lightning strikes, temperature, moisture, fluids/fungus, and thermal shock are all factors that should be evaluated. Cost considerations can also affect the design and deployment of a radome, including costs associated with development, fabrication facilities, and testing.

SUMMARY OF THE INVENTION

Methods and apparatus for structures according to various aspects of the present invention operate in conjunction with various applications and structures. In one embodiment, a missile radome comprises a wall defining the radome body, including a base and a tip. The wall may comprise a core and one or more skins adjacent the core, such as in a sandwich configuration. The core and the skins may have different densities. The radome wall may be configured to transmit wideband RF signals. The radome may comprise reaction bonded silicon nitride, which may be extruded to form the radome.

BRIEF DESCRIPTION OF THE DRAWINGS

A more complete understanding of the present invention may be derived by referring to the detailed description and claims when considered in connection with the figures, wherein like reference numbers refer to similar elements throughout the figures.

Figure 1:
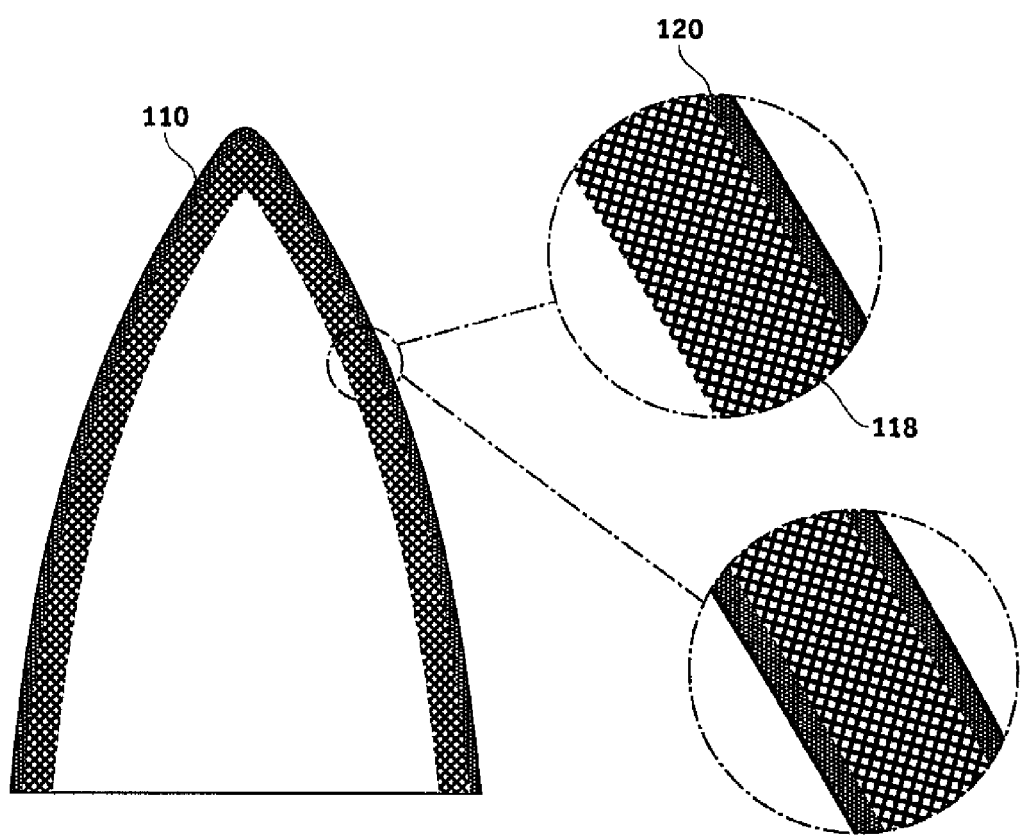
FIG. 1 illustrates a radome according to various aspects of the present invention.

Representative elements, operational features, applications and/or advantages of the present invention reside in the details of construction and operation as more fully depicted, described or otherwise identified—reference being had to the accompanying drawings, images, and figures, wherein like numerals refer to like parts throughout. Other elements, operational features, applications and/or advantages may be apparent in light of certain exemplary embodiments recited.

The elements in the figures, drawings, and images are illustrated for simplicity and clarity and have not necessarily been drawn to scale. For example, the dimensions of some of the elements in the figures may be exaggerated relative to other elements to help improve understanding of various embodiments of the present invention. Furthermore, the terms 'first', 'second', and the like, if any, are used for distinguishing between similar elements and not necessarily for describing a sequential or chronological order. Moreover, the terms 'front', 'back', 'top', 'bottom', 'over', 'under', and the like in the disclosure and/or in the claims, if any, are generally employed for descriptive purposes and not necessarily for comprehensively describing exclusive relative position. Any of the preceding terms so used may be interchanged under appropriate circumstances such that various embodiments of the invention described, for example, are capable of operation in other configurations and/or orientations than those explicitly illustrated or otherwise described.

DETAILED DESCRIPTION OF EXEMPLARY EMBODIMENTS

The present specification and accompanying drawing show an exemplary embodiment by way of illustration and best mode. While these exemplary embodiments are described, other embodiments may be realized, and logical and mechanical changes may be made without departing from the spirit and scope of the invention. Thus, the detailed description is presented for purposes of illustration only and not of limitation. For example, the steps recited in any of the methods or process descriptions may be executed in any suitable order and are not limited to the order presented. Further, conventional mechanical aspects and components of the individual operating components of the systems may not be described in detail.

The representations of the various components are intended to represent exemplary functional relationships, positional relationships, and/or physical couplings between the various elements. Many alternative or additional functional relationships, physical relationships, or physical connections may be present in a practical system. The present invention is described partly in terms of functional components and various methods. Such functional components may be realized by any number of components configured to perform the specified functions and achieve the various results.

In various embodiments, the present invention may be implemented in other structures, such as structures exposed to high temperatures. The present invention may be practiced in conjunction with any number of applications and environments, and the systems described are merely exemplary applications of the invention. Further, the present invention may employ any number of conventional techniques for manufacture, deployment, and/or the like.

Structures according to various aspects of the present invention may exhibit various characteristics, such as structural, thermal, electrical, and magnetic properties, adapted to the applications and operating environments of the structures. For example, the structures may comprise elements performing various functions while exposed to high temperatures, such as elements of high speed aircraft. High temperature aircraft structures may comprise missile fuselage components, antennae, windows, electromagnetic windows, thermal protection systems, leading edges, nozzles, throats, jet vanes and/or the like. Alternative embodiments may operate in other environments, such as other craft, manufacturing and processing applications, combustion systems, or other appropriate applications.

Referring to FIG. 1, in the present embodiment, a structure according to various aspects of the present invention may comprise a radome 110, such as for a high-speed missile. The radome 110 may be configured in any appropriate manner to achieve desired radome characteristics, such as thermal, electrical, magnetic, aerodynamic, and/or structural characteristics, and meet any relevant physical criteria, such as size, shape, weight, texture, form, thickness, and density. The radome 110 may be configured according to any suitable characteristics, including camouflage, stealth, deflection, diffusion, physical footprint, aerodynamics and/or the like.

The present exemplary hypersonic missile radome 110 may have an aerodynamic, low-drag Von Karman or tangent ogive shape. The radome 110 may have a base diameter close to that of the missile and a length at least two times the base diameter. The radome 110 suitably comprises a low-weight, durable material resistant to impacts, such as bird strikes and rain erosion, and to variable weather conditions. The radome 110 may also provide an integral hermetic seal to the missile to minimize exposure of components within the radome 110.

The mechanical design of the radome 110, such as the wall design, skin thickness, and attachment schemes, may affect the robustness of the radome 110. Although thin monolithic walls tend to reduce weight and increase electrical performance, thin monolithic walls may be structurally less reliable, especially when subjected to harsh thermal environments. The radome 110 may be adapted to provide appropriate structural integrity, thermal behavior, wall design, weight, manufacturing complexity, cost, mechanical behavior, thermo-electrical behavior, and thermal shock resistance.

In the present embodiment, the radome 110 comprises a wideband radome configured to maintain structural integrity while exposed to high temperatures associated with hypersonic flight. To operate under high temperatures, the radome 110 may comprise materials and structures to resist thermal shock and maintain integrity while exposed to high temperatures for extended periods, such as several minutes. In addition, the radome 110 walls may be configured to provide the desired electromagnetic characteristics. For example, for the present wideband radome 110 providing wideband transmittance, the radome 110 walls may comprise an appropriate material, thickness, and structure to transmit electromagnetic energy over a wide bandwidth.

Figure 2:
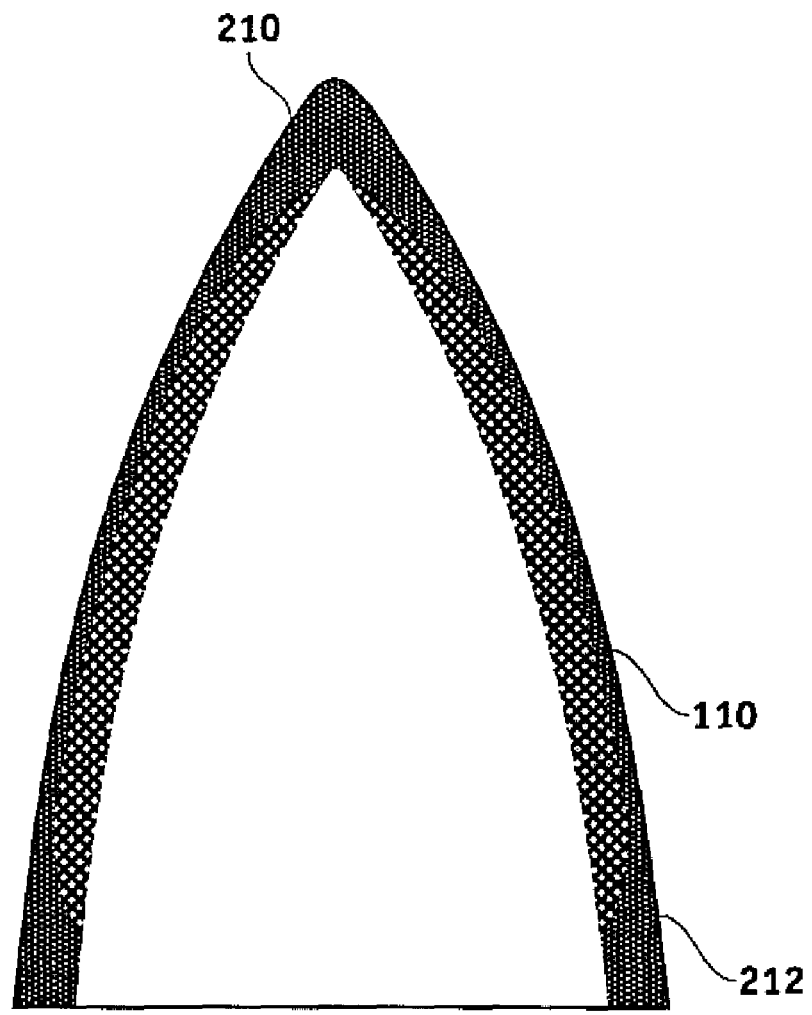
FIG. 2 illustrates a radome including denser materials at a front end and around a base perimeter.

In many configurations, the radome 110 walls may be relatively thin, such as to accommodate transmission of selected wavelengths and/or reduce weight. On the other hand, the radome 110 walls may be thicker or denser for improved manufacturability and mechanical durability. In addition, referring to FIG. 2, the radome 110 walls may be non-uniform, such as having higher densities near the tip 210 and base 212 for improved structural integrity.

The radome 110 may comprise any appropriate materials, such as strong, lightweight, RF-transmissive materials, that meet the performance requirements of the radome 110. The materials and fabrication processes may be low-cost, high-yield, and versatile to accommodate different designs, sizes, and variations. For example, the radome 110 of the present embodiment comprises an extruded material that exhibits the proper characteristics for the radome 110, such as reaction bonded silicon nitride (RBSN). RBSN structures generally exhibit good thermal shock resistance, resistance to water or other liquids, high electrical resistivity, low density, strength at high temperatures, oxidation resistance, and formability into complex shapes. RBSN structures may be fabricated through various techniques, including sintering, solid free-form fabrication, or other fabrication processes.

The RBSN material may be substantially pure or it may contain suitable additives or introduced impurities. For example, the RBSN may comprise certain oxides, such as yttria and/or alumnia, to facilitate processing and densification. Such additives may provide high strength at ordinary temperatures, but may lead to unacceptable degradation of mechanical strength and increases in dielectric loss at higher temperatures. RBSN materials may also be produced without additives, such as by converting a silicon powder green body to $Si_3N_4$ by gaseous nitriding or other methods. Without additives, the structural properties do not significantly degrade (and may improve) at temperatures up to approximately 1500° C. Additionally, RBSN presents a lower density and lower dielectric constant compared to conventional radomes and other high temperature elements.

In the present embodiment, the RBSN is derived from conventional silicon powders. The RBSN material is selected and configured for thermal, mechanical, and electrical characteristics for radomes. The RBSN material maintains high fracture strength and low dielectric loss at high temperatures over extended periods, such as several minutes. In addition, the RBSN material may exhibit an inherent refractory nature, high RF transmission, and resistance to rain impact.

The radome 110 material may be configured in any appropriate manner to meet the desired characteristics. For example, the radome 110 may comprise a single homogeneous material, such as a monolithic wall of RBSN, or a heterogeneous structure, such as a layered construction of different materials and/or densities. In general, reducing skin thickness and dielectric constant increases the bandwidth of the design. Considerations for material strength and thermal characteristics may limit the amount of bandwidth that can be achieved by reducing the skin thickness. For narrowband applications, monolithic structures may be suitable, but for higher frequencies, such monolithic shells become extremely thin and challenging to fabricate.

Referring again to FIG. 1, for broadband radomes 110 configured to transmit over multiple RF frequencies, the radome 110 wall may comprise low dielectric constant materials in a layered design, for example alternating layers of higher and lower dielectric constant materials. The layered structure may comprise multiple materials to create desired density, transmission qualities, shielding, or other characteristics. The layered construction may facilitate unique dielectric properties and weight reduction over monolithic designs.

Figure 3:
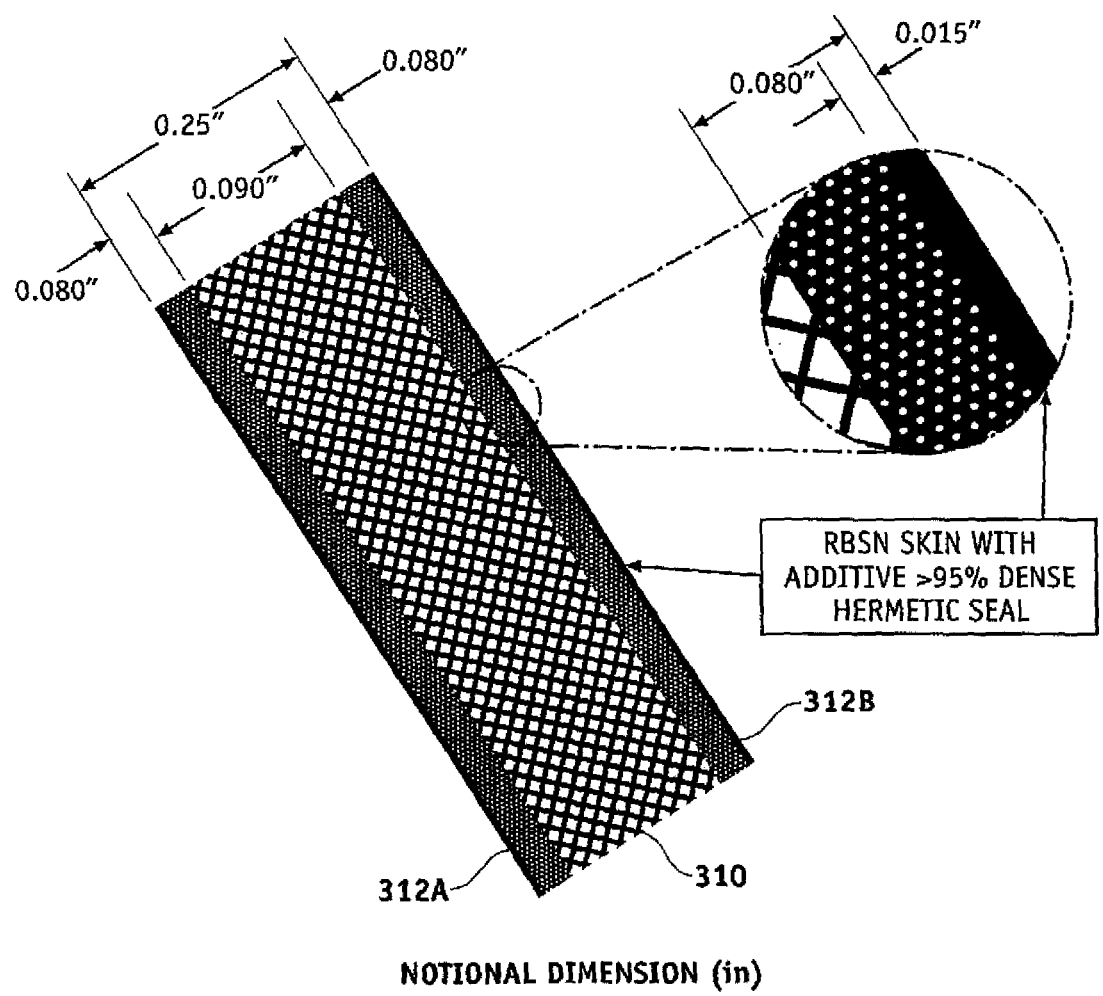
FIG. 3 illustrates an exemplary sandwich configuration.

In one embodiment, the radome 110 walls comprise nonuniform density, lightweight, thermal protection walls suitable for wideband applications. The layered structure may be configured in any suitable manner according to the materials and desired properties of the radome 110. For example, referring to FIG. 3, an all-RBSN structure comprising an approximately 0.090-inch thickness low density core 310 between two approximately 0.08-inch higher density skin layers 310A-B may exhibit appropriate electrical performance comparable to conventional monolithic radomes, but with superior structural and rain erosion properties.

Figure 4A:
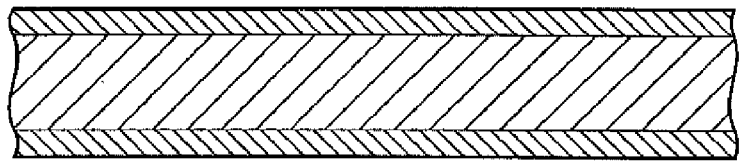
FIGS. 4A-B illustrate exemplary sandwich configurations.
Figure 4B:
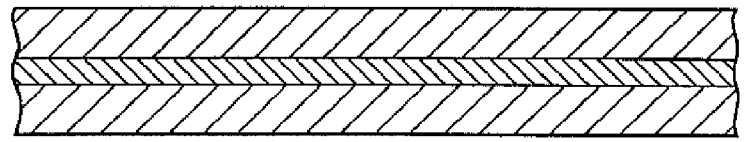

The layers may be configured in any appropriate manner to achieve the desired properties. For example, the radome 110 wall may include any number of layers having any number of densities and different materials. In addition, the layers may include various thicknesses or other characteristics to meet particular design requirements. Referring to FIG. 4A, the radome 110 wall may comprise a sandwich structure comprising a lower density core and two higher density skin layers. Alternatively, referring to FIG. 4B, the sandwich design may comprise a denser core and two lower density skin layers. Further, referring again to FIG. 1, the radome 110 wall may comprise a single lower density core layer 118 and a single higher density exterior skin layer 120.

The low density core 310 provides lower weight and desired electromagnetic characteristics, among other properties. In the present embodiment, the low density core 310 of the sandwich wall design may provide thermal insulation that reduces heat flow through the element into other components, such as an internal RF seeker antenna or other components. The low density core 310 may comprise any appropriate material, such as one or more layers of micro-scale honeycomb or other porous 3-D micro geometry network structure of RBSN.

The higher density skin layers 312A-B provide structural support and a hermetic seal. The density and material of the skin layers 312A-B may be selected according to any appropriate criteria, such as desired sealing and structural characteristics. In one embodiment, the skin layers 312A-B may comprise identical layers to optimize wave propagation. The materials and/or densities may also be varied to achieve any desired properties for the particular application.

Structures according to various aspects of the present invention may be created and finished according to any appropriate processes. For example, the fabrication process may be manual or computer-controlled, and may employ any suitable techniques, such as extrusion, molding, machining, or stamping. In one embodiment of the present invention, the radome 110 is formed in conjunction with an automatic extrusion process. In the present embodiment, the radome 110 is formed using a computer-controlled solid freeform fabrication process using feedstock comprising a ceramic particle-filled thermoplastic binder.

Fabrication techniques according to various aspects of the present invention may be computer controlled, enable complex design features, and enable variable density in cross section. In one representative embodiment, a fabrication system for the radome 110 may comprise a computer-driven system compatible with common design formats, such as computer aided design, computer aided drafting, object oriented programming, automated digital prototyping, use of a geometry constraint engine, and/or the like. In one embodiment, thermal, electrical, magnetic, or power functions may be suitably optimized or otherwise altered manually or automatically via the computer. The fabrication techniques may be automated, highly repeatable, and/or minimize waste yields and/or the like.

Figure 5:
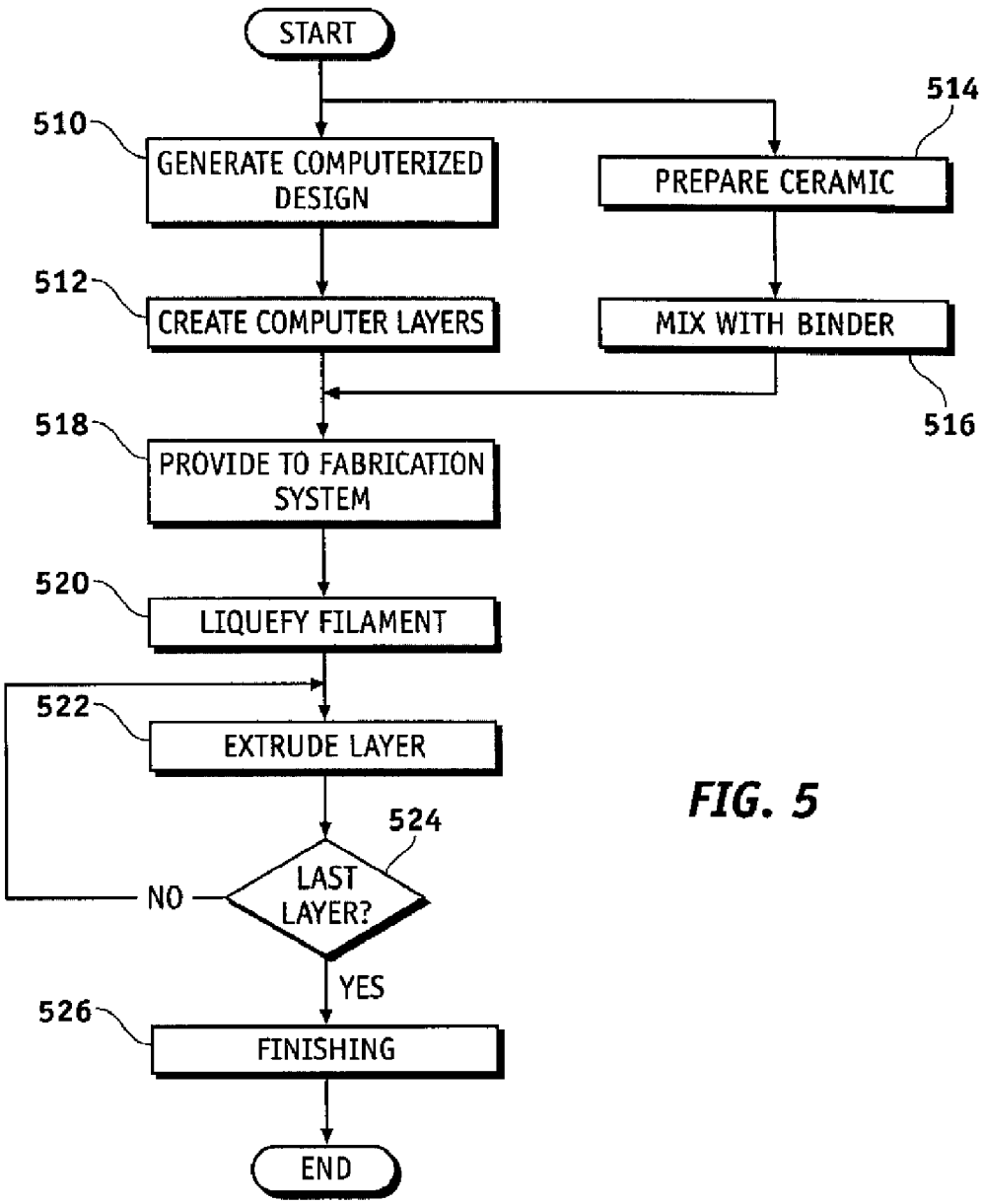
FIG. 5 illustrates a process for generating a radome.

Computer-controlled processes may offer reductions in model time and cost. In the present embodiment, referring to FIG. 5, a computerized model of the radome 110 may be provided to the computer (510), which may computationally slice the radome 110 into layers (512). The layer information may then be sent to a fabricator that reproduces the layer in a real material (518).

In the present embodiment, the radome 110 may be formed from an extrudable material. The extrudable material may comprise any suitable material for the radome 110. For example, the material may comprise a ceramic, foam, silica, metal, plastic, nanomaterial, sinterable powders, and/or other material that can be suspended in a binder, such as a polymer-based binder. In the present embodiment, the RBSN material may be prepared by heating a compact of silicon powder in a nitrogen gas atmosphere. Nitrogen-hydrogen or nitrogen-hydrogen-helium gas mixtures may be used as they give fast and easily controlled reaction rates and result in high strength materials. The silicon powder may comprise any appropriate powder, such as a conventional submicron silicon powder. Further, the silicon powder may comprise a submicron, spherical, high purity silicon powder, such as produced by laser induced decomposition of silane gas. The RBSN is a nitride material derived from the nitriding process of silicon particles.

For extrusion, the silicon powder (514) may be suspended in the polymer binder to produce an extrudable filament or feedstock (516). Alternatively, RBSN or other material may be suspended in the binder. In the present embodiment, the green body including the silicon powder is nitrided in a finishing phase after formation of the radome 110 or other element. The quantity of RBSN or silicon powder suspended in the binder may be adapted according to the product or process. In the present embodiment, the filament comprises approximately 55% by volume silicon powder. The binder may comprise a conventional binder, such as a thermoplastic organic or inorganic polymer binder.

The radome 110 may be formed by extruding the filament in the form of the radome 110. Fabrication techniques of the present invention may comprise any number of techniques suitable for configuring the materials. In the present embodiment, the radome 110 is formed using solid freeform fabrication (SFF). Solid free-from fabrication may comprise electron beam melting, electron beam freeformi fabrication, fused deposition modeling, laminated object manufacturing, laser engineered net shaping, selective laser sintering, shape deposition manufacturing, solid ground curing, stereolithography, three-dimensional printing, robocasting, rapid prototyping, rapid manufacturing, layered manufacturing, additive fabrication, and/or the like. While SFF has historically been used for prototyping, it is a viable manufacturing process for production quantity components.

Using solid freeform fabrication, objects can be formed with any geometric complexity or intricacy without the need for elaborate machine setup or final assembly and objects can be made from multiple materials, or as composites, or materials can even be varied in a controlled fashion at any location in an object. SFF may allow for building structures with multiple materials, different densities, selective functional layers and/or areas, integrated electromagnetic shielding materials, and the like. SFF also provides design freedom, material diversity, automated manufacturing, near net shape fabrication, low manufacturing costs, and scalability for manufacturing.

In the present embodiment, a fused deposition of ceramic technique may be used to form the radome 110. The ceramic-filled filament is fed into a liquefier (520), where it softens and then is extruded through one or more fine orifices in one or more deposition heads. Each deposition head deposes fine streams of material according to instructions from the computer to create each layer (522). As the filament is deposited, it bonds to the previously deposited material. The fabrication scheme is continued in a layer-wise fashion until the element is completed (524).

Different density layers may be formed in any appropriate manner. For example, different materials may be used to form the different densities in the radome 110. In the present embodiment, the extruding system may be configured to form a porous structure, such as a micro-scale honeycomb or other porous three dimensional micro geometry network structure. For example, to make a solid part, deposited material is slightly overlapped. To form a porous structure, the extruding system may deposit multiple roads with deliberate gaps, porosity and/or density gradients. The extrusion rate and temperature may also be adjusted to yield the desired properties.

Upon completion of the last layer, the radome 110 or other element may be finished in any appropriate manner (526). For example, the binder material may be removed from the radome 110, and the radome 110 may be polished, machined, coated, or otherwise processed to finalize the fabrication process. If the filament comprises a silicon powder, the green body may be routed through a binder removal process and nitrided to yield the RBSN structural material.

Solid freeform fabrication offers reduced manufacturing cost by minimizing or eliminating final machining. Solid freeform fabrication may yield a product approximating the finished product, with little need for machining or other finishing. The solid freeform fabrication process may be used to extrude one material or multiple materials in the finished element. Proper manufacturing of the wall construction allows for the exploitation of each material's key performance parameters as it contributes to the overall performance. Once defined, the process requires little manual intervention and is highly repeatable. Such processes require minimal tooling and finishing costs.

The particular implementations shown and described are illustrative of the invention and its best mode and are not intended to otherwise limit the scope of the present invention in any way. Indeed, for the sake of brevity, conventional materials, fabrication techniques, designs and ballistic applications and/or the like may not be described in detail.

Although the description above contains many details, these should not be construed as limiting the scope of the invention but as merely providing illustrations of some of the exemplary embodiments of this invention. The scope of the present invention fully encompasses other embodiments, and is accordingly to be limited by nothing other than the appended claims, in which reference to an element in the singular is not intended to mean "one and only one" unless explicitly so stated, but rather "one or more." All structural, chemical, material, and functional equivalents to the elements of the above-described exemplary embodiments are expressly incorporated by reference and are intended, unless otherwise specified, to be encompassed by the claims. Moreover, it is not necessary for a device or method to address each and every problem sought to be solved by the present invention for it to be encompassed by the present claims. Furthermore, no element, component, or method step in the present disclosure is intended to be dedicated to the public regardless of whether the element, component, or method step is explicitly recited in the claims. No claim element is to be construed under the provisions of 35 U.S.C. 112, sixth paragraph, unless the element is expressly recited using the phrase "means for." The terms "comprises", "comprising", or any other variation, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. An aircraft component, comprising a reaction bonded silicon nitride (RBSN), wherein the RBSN comprises extruded RBSN.

2. An aircraft component according to claim 1, wherein the extruded RBSN is extruded using solid freeform fabrication.

3. An aircraft component according to claim 1, wherein the RBSN defines a wall of a radome.

4. An aircraft component according to claim 3, wherein the wall comprises:
   a core comprising a low density material; and
   at least one skin comprising a higher density material adjacent the low density material,
wherein at least one of the low density material and the higher density material comprises the RBSN.

5. An aircraft component according to claim 3, wherein the wall comprises:
   at least one skin comprising a low density material; and
   a core comprising a higher density material adjacent the skin,
wherein at least one of the low density material and the higher density material comprises the RBSN.

6. An aircraft component according to claim 3, wherein the wall is configured to transmit wideband RF signals.

7. An aircraft component according to claim 3, wherein the wall defines a main wall portion, a base, and a tip, wherein at least one of the base and the tip comprises a higher density material than the main wall portion.

8. An aircraft component according to claim 3, wherein the wall comprises:
   two skins, wherein each skin is approximately 0.08 inches thick; and
   a core approximately 0.095 inches thick and disposed between the skins,
wherein the core comprises a low density RBSN material and at least one of the skins comprises a higher density material.

9. A missile radome, comprising:
   a wall defining an interior area, an exterior shape of the radome, a tip, and a base, wherein the wall comprises:
      a low density core; and
      a higher density skin adjacent the low density core, wherein:
         at least one of the core and the skin comprises a thickness configured to transmit wideband RE signals; and
         at least one of the core and the skin comprises a reaction bonded silicon nitride (RBSN).

10. A missile radome according to claim 9, wherein the RBSN comprises extruded RBSN.

11. A missile radome according to claim 10, wherein the extruded RBSN is extruded using solid freeform fabrication.

12. A missile radome according to claim 9, wherein at least one of the base and the tip comprises a higher density material than a main wall portion of the wall.

13. A missile radome according to claim 9, wherein:
each skin is approximately 0.08 inches thick; and
the core is approximately 0.095 inches thick.

14. A method for forming an aircraft component, comprising:
adding a silicon powder to a binder;
extruding the silicon powder and the binder in the form of the aircraft component; and
nitriding the silicon powder to form reaction bonded silicon nitride (RBSN).

15. A method according to claim 14, wherein the aircraft component comprises a radome.

16. A method according to claim 14, wherein extruding the silicon powder and the binder comprises:
extruding a low density core; and
extruding a higher density skin adjacent the core.

17. A method according to claim 14, wherein extruding the silicon powder and the binder comprises:
extruding a low density skin; and
extruding a higher density core adjacent the skin.

18. A method according to claim 14, wherein extruding the silicon powder and the binder comprises forming the aircraft component using solid freeform fabrication.

19. A method according to claim 14, wherein the aircraft component is configured to transmit wideband RF signals.

20. A method according to claim 14, wherein extruding the silicon powder and the binder comprises extruding a higher density portion and a lower density portion.

21. A method according to claim 14, wherein extruding the silicon powder and the binder comprises extruding a wall, wherein the wall comprises:
two skins, wherein each skin is approximately 0.08 inches thick; and
a core approximately 0.095 inches thick and disposed between the skins.

* * * * *